United States Patent
Sudhues et al.

(10) Patent No.: US 12,426,539 B2
(45) Date of Patent: Sep. 30, 2025

(54) CUTTING MECHANISM WITH LEAF SPRING ASSEMBLY AS A CUTTING ELEMENT SUPPORT

(71) Applicant: Carl Geringhoff GmbH & Co. KG, Ahlen (DE)

(72) Inventors: Steffen Sudhues, Ahlen (DE); Alexander Heitkamp, Dülmen (DE); Andre Hemmesmann, Sassenberg (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 864 days.

(21) Appl. No.: 17/761,682

(22) PCT Filed: Sep. 15, 2020

(86) PCT No.: PCT/EP2020/075718
§ 371 (c)(1),
(2) Date: Mar. 18, 2022

(87) PCT Pub. No.: WO2021/052936
PCT Pub. Date: Mar. 25, 2021

(65) Prior Publication Data
US 2022/0338415 A1   Oct. 27, 2022

(30) Foreign Application Priority Data
Sep. 19, 2019   (DE) ..................... 10 2019 125 277.6

(51) Int. Cl.
*A01D 41/14* (2006.01)
*A01D 34/30* (2006.01)
*A01D 57/20* (2006.01)

(52) U.S. Cl.
CPC .............. *A01D 41/14* (2013.01); *A01D 34/30* (2013.01); *A01D 41/141* (2013.01); *A01D 57/20* (2013.01)

(58) Field of Classification Search
CPC ...... A01D 41/14; A01D 34/30; A01D 41/141; A01D 57/20
See application file for complete search history.

(56) References Cited

U.S. PATENT DOCUMENTS

| | | | | |
|---|---|---|---|---|
| 3,896,610 A | * | 7/1975 | Hiniker | A01D 41/14 56/15.8 |
| 3,982,383 A | * | 9/1976 | Mott | A01D 57/26 56/DIG. 15 |

(Continued)

FOREIGN PATENT DOCUMENTS

| | | |
|---|---|---|
| FR | 2324219 | 4/1977 |
| WO | 2007/095430 | 8/2007 |

*Primary Examiner* — Arpad Fabian-Kovacs
(74) *Attorney, Agent, or Firm* — Gudrun E. Huckett

(57) ABSTRACT

The invention relates to a cutting mechanism (4) for installing on a harvesting machine (2). The aim of the invention is to provide a cutting mechanism which comprises a mounting for the cutting elements and which adapts easily to the soil contour without thereby tilting into an uncontrolled swing. This is achieved in that multiple or all of the rocker arms (16) are designed as a respective leaf spring assembly (20) composed of multiple leaf springs (22), multiple or all of the leaf springs (22) lying flatly one on top of the other as a leaf spring assembly (20) are held together on the frame (6) between clamping elements (24) at the frame-side leaf spring ends, and only one or multiple leaf springs (22) arranged in the upper region of the leaf spring assembly (20) are connected to the cutting elements (18). One or more of the leaf springs (22) which are held on the frame (6) between the clamping elements (24) and are arranged in the lower region of the leave spring assembly (20) terminate, when (Continued)

Figure 1:
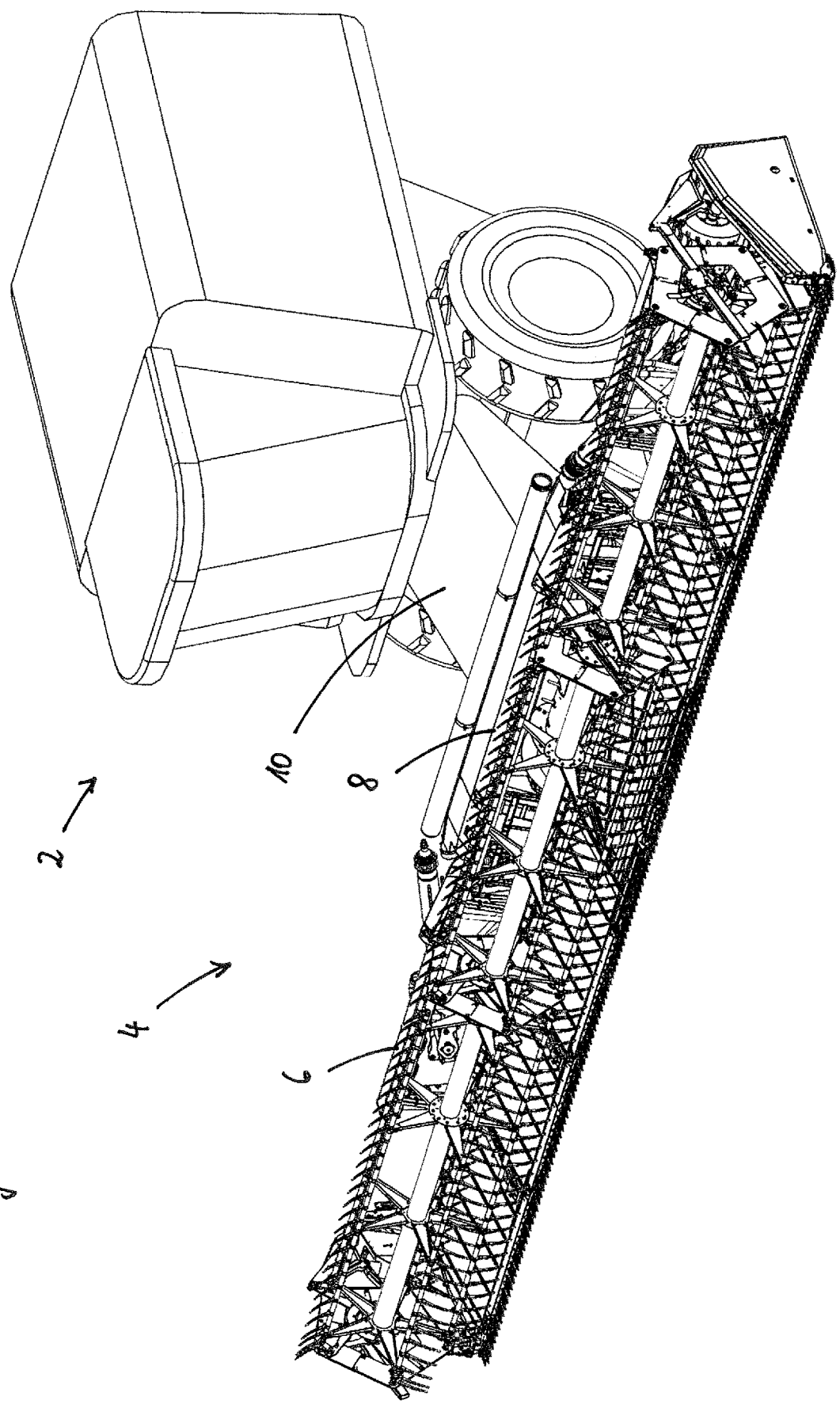

viewed in the working direction, in front of the connection zone (26) of the leave springs (22) which are arranged in the upper region of the leaf spring assembly (20) and comprise the cutting elements (18).

16 Claims, 10 Drawing Sheets

(56) References Cited

U.S. PATENT DOCUMENTS

| | | | | |
|---|---|---|---|---|
| 4,011,709 | A * | 3/1977 | Mott | A01D 41/148 56/14.4 |
| 4,091,602 | A | 5/1978 | Williams et al. | |
| 4,206,583 | A * | 6/1980 | Week | A01D 41/14 56/15.8 |
| 4,414,793 | A * | 11/1983 | Halls | A01D 41/14 56/15.8 |
| 4,444,000 | A * | 4/1984 | Enzmann | A01D 41/16 56/DIG. 9 |
| 4,573,308 | A * | 3/1986 | Ehrecke | A01D 41/14 56/15.8 |
| 4,599,852 | A * | 7/1986 | Kerber | A01D 41/14 56/15.8 |
| 4,660,360 | A * | 4/1987 | Hardesty | A01D 41/14 56/15.8 |
| 5,464,371 | A | 11/1995 | Honey | |
| 5,711,140 | A * | 1/1998 | Burmann | A01D 41/148 56/14.4 |
| 6,351,931 | B1 * | 3/2002 | Shearer | A01D 57/20 56/DIG. 17 |
| 6,782,683 | B2 * | 8/2004 | Buermann | A01D 41/14 56/257 |
| 7,640,720 | B1 * | 1/2010 | Lovett | A01D 57/20 56/153 |
| 7,877,976 | B2 * | 2/2011 | Honas | A01D 41/14 56/208 |
| 7,971,418 | B2 * | 7/2011 | Conrad | A01D 41/148 56/181 |
| 7,975,462 | B1 * | 7/2011 | Figgins | A01D 41/14 56/181 |
| 7,992,374 | B1 * | 8/2011 | Bich | A01D 41/141 56/208 |
| 8,484,939 | B1 * | 7/2013 | Cormier | A01D 41/14 56/181 |
| 8,511,050 | B1 * | 8/2013 | Cormier | A01D 61/002 56/181 |
| 8,573,388 | B2 * | 11/2013 | Hoffman | B65G 23/44 198/816 |
| 8,752,359 | B2 * | 6/2014 | Cormier | A01D 41/14 56/181 |
| 9,591,802 | B2 * | 3/2017 | Allochis | A01D 34/18 |
| 10,390,486 | B2 * | 8/2019 | Hasenour | A01D 41/14 |
| 10,462,968 | B2 * | 11/2019 | Shearer | A01D 41/141 |
| 2007/0193243 | A1 * | 8/2007 | Schmidt | A01D 43/06 56/181 |
| 2007/0204589 | A1 * | 9/2007 | Coers | A01D 61/002 56/208 |
| 2008/0022646 | A1 | 1/2008 | Patterson et al. | |
| 2008/0092508 | A1 * | 4/2008 | Talbot | A01D 61/002 56/181 |
| 2008/0271426 | A1 * | 11/2008 | Lohrentz | A01D 57/20 56/153 |
| 2009/0288383 | A1 * | 11/2009 | Sauerwein | A01D 57/20 56/181 |
| 2014/0041354 | A1 * | 2/2014 | Coon | A01D 41/06 56/158 |
| 2018/0368323 | A1 * | 12/2018 | Martens | A01D 61/02 |

\* cited by examiner

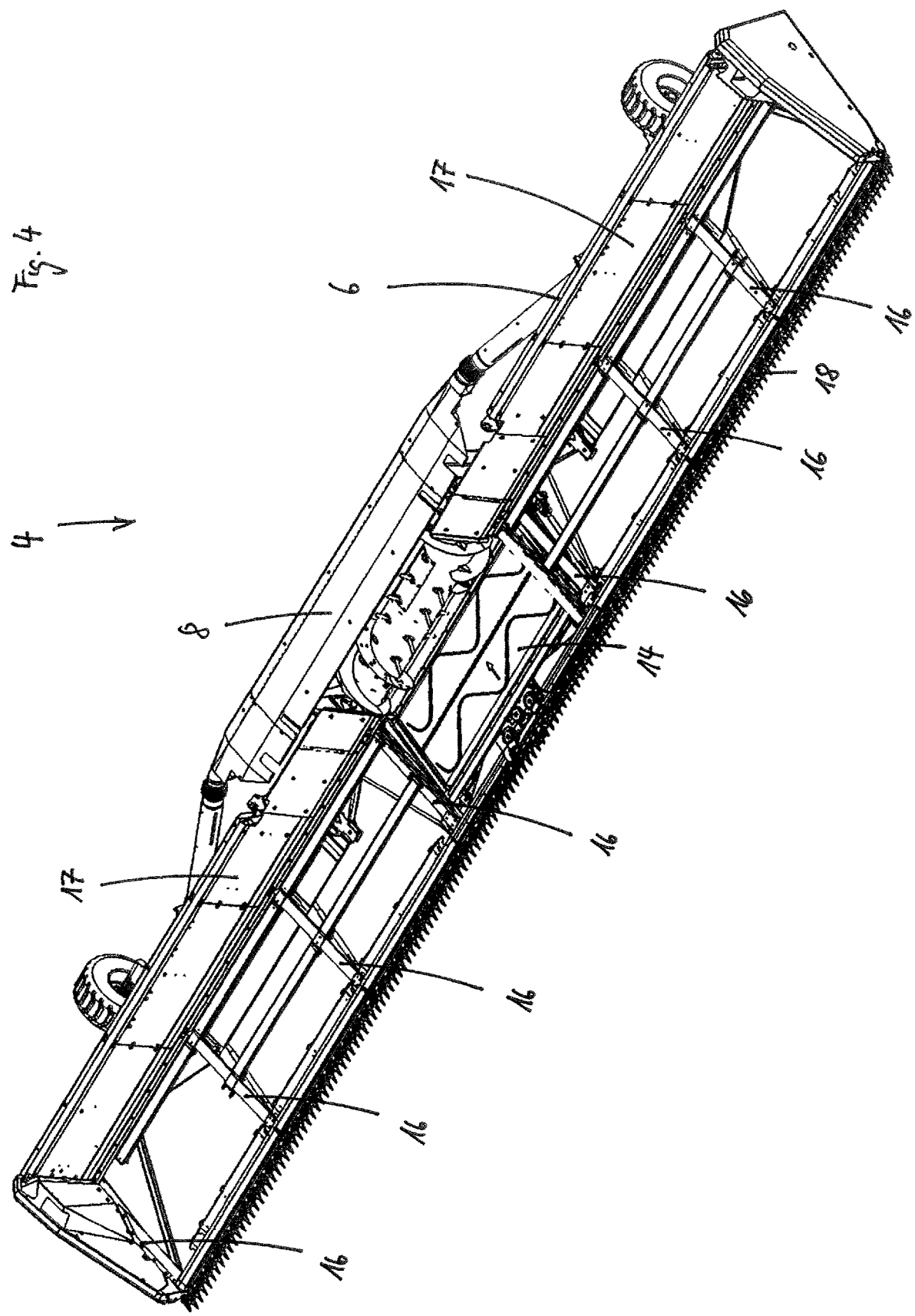

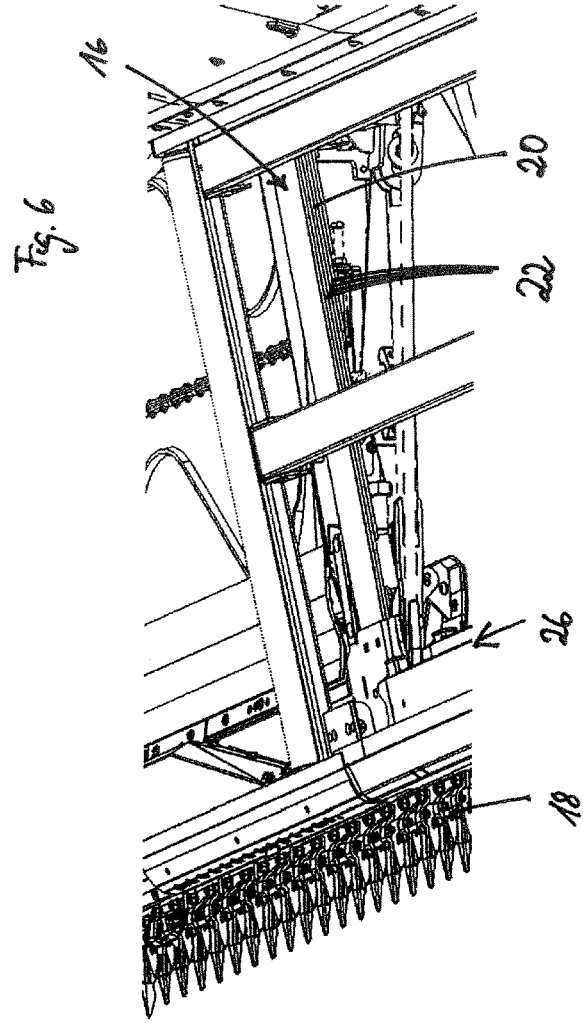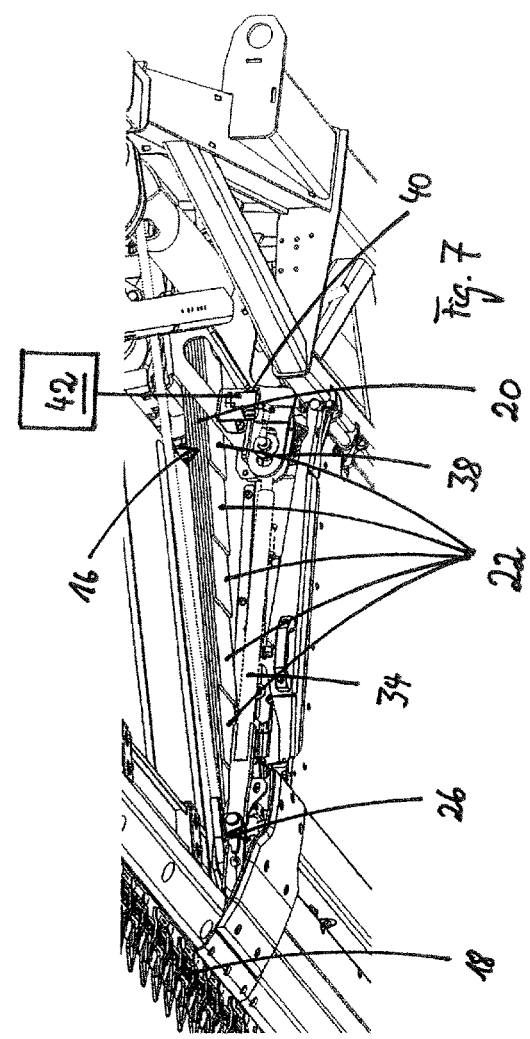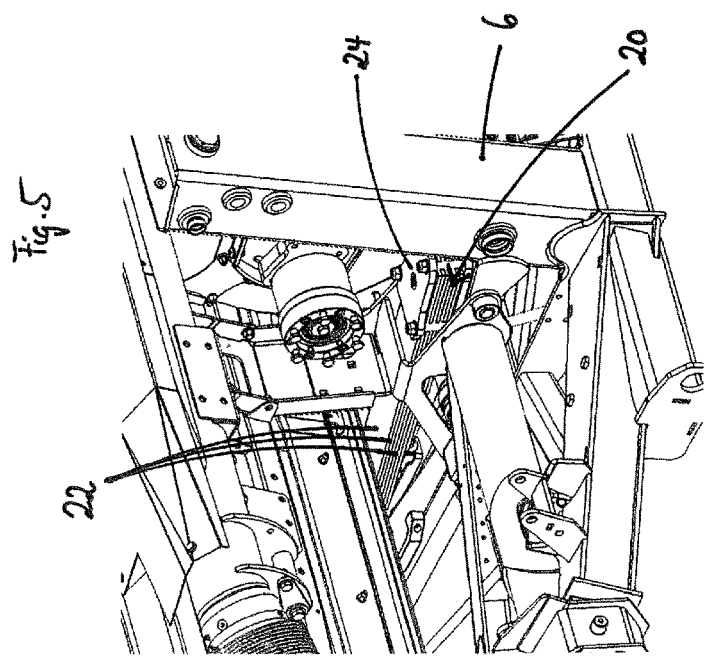

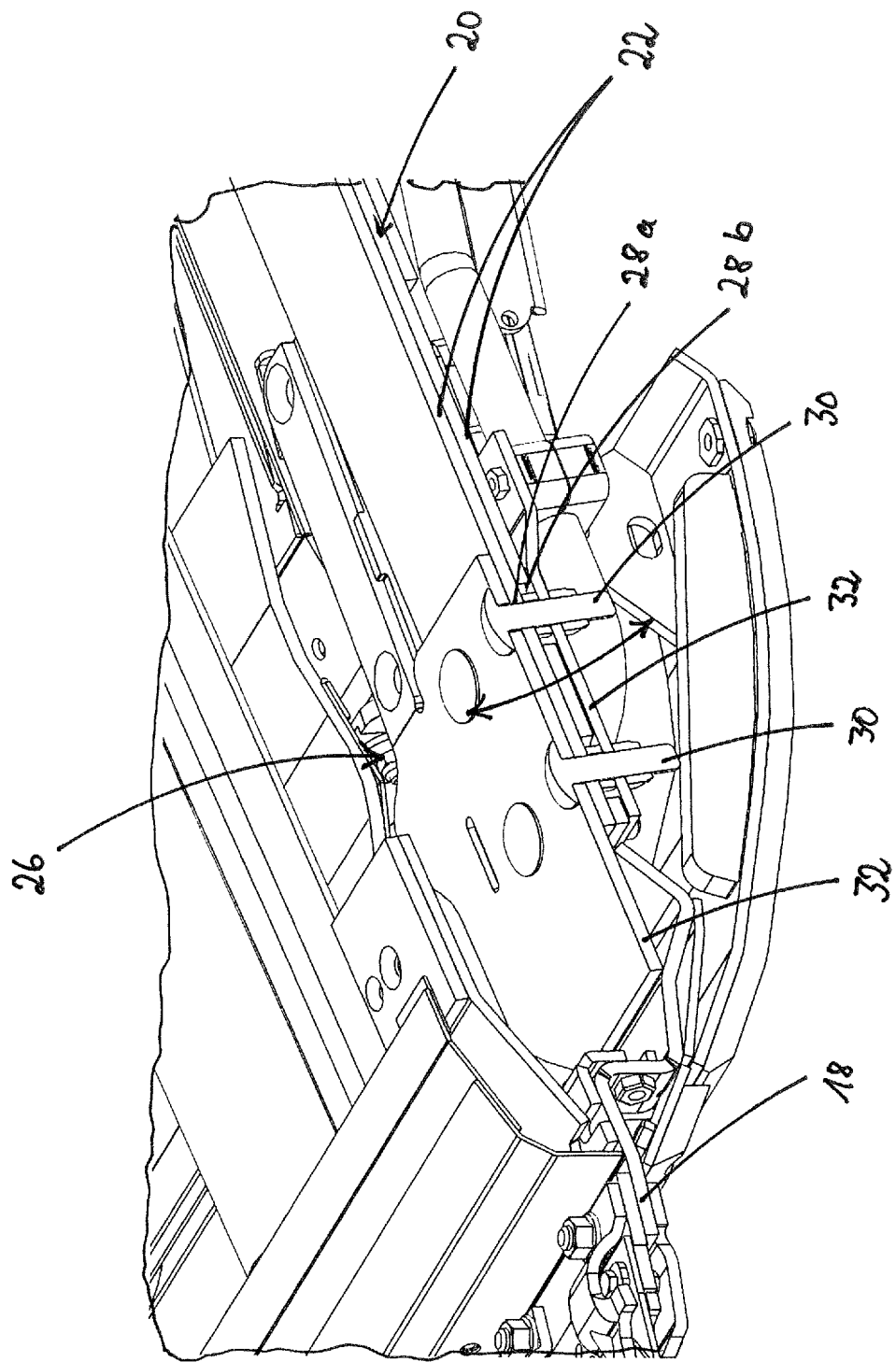

CUTTING MECHANISM WITH LEAF SPRING ASSEMBLY AS A CUTTING ELEMENT SUPPORT

The present invention concerns a cutting mechanism for attachment to a harvesting machine with a frame extending at least substantially across the working width of the cutting mechanism and comprising an attachment frame with attachment means for connection to an intake channel of a harvesting machine, wherein the frame comprises rocker arms pointing in working direction and having fastened at their leading ends cutting elements for cutting the crop.

Usually, cutting mechanisms are provided with rigid frames having fixedly installed at their leading ends cutter bars with a plurality of adjacently arranged oscillating knife blades, as an example of cutting elements, which, with oscillating knife movements, cut the crop present at the cutter bar from the stubble remaining on the field so that it can fall on the cutting mechanism and from there can be conveyed for further processing through the intake channel to the harvesting machine. With such rigid frames and rigidly installed cutter bars, it is however difficult, in particular in case of uneven ground conditions, to pick up crop when the crop is lying close to the ground which is the case, for example, for laid grain or soybean. Also, it can be desirable to cut the crop as close to the ground as possible, be it for reasons of field hygiene or for obtaining a straw yield as high as possible. Even though ground copying controls are known with which the cutting mechanisms are to be guided close to the ground, they react however frequently too slowly in order to harvest and convey as much as possible of all of the crop even under difficult conditions. Also, a ground adaptation in partial widths of rigid cutting mechanisms is not possible which is disadvantageous for cutting mechanisms that become wider and wider. Often, the cutting mechanisms are also still guided too high due to corresponding adjustments by the driver of the harvesting machine in order to avoid damages due to ground or rock contact.

It is known from the publication WO 2007/095 430 A2 to fasten the rocker arms, having fastened at their leading ends the cutter bar with the knife blades, in a rotary joint at the rear cutting mechanism frame so that the cutter bar with the rocker arms that can move up and down can better adapt to changing ground contours even in partial sections of the working width. However, it remains open how the rocker arms are to be held as close as possible to the ground. The weight of the cutter bar alone is not sufficient to ensure a knife guiding action close to the ground.

Form the publication U.S. Pat. No. 5,464,371 A, it is known to support a rigid pivotable rocker arm, having secured at its leading end a cutter bar with knife blades, by a leaf spring assembly so that the cutting mechanism can adapt more flexibly to the ground conditions. This results in a pivot movement of a rocker arm, rigid across its length, about an axis of rotation that is supported in a springy manner. Due to the swinging behavior of the leaf springs, the cutter bar is however not maintained uniformly close to the ground.

The publication U.S. Pat. No. 4,599,852 A discloses as a rocker arm a single leaf spring that has a curved course in order to be able to swing freely. Due to the free swinging action of a single spring, the cutter bar cannot be guided strongly enough on the ground. The same holds true for the cutting mechanism disclosed in the publication US 2008/022646 A.

It is the object of the present invention to provide a cutting mechanism with an attachment for the cutting elements that adapts easily to the ground contour without however tending to swing in an uncontrolled manner.

The object is solved for a cutting mechanism of the aforementioned kind in that a plurality of or all rocker arms are each embodied as a leaf spring assembly assembled of one or a plurality of spring leaves, a plurality of spring leaves resting flat on each other as a leaf spring assembly are held together at their frame-side end between clamping elements at the frame, only one or a plurality of the spring leaves arranged in the upper region of the leaf spring assembly are connected to the cutting elements, and one or a plurality of the spring leaves held between the clamping elements at the frame and arranged in the lower region of the leaf spring assembly, viewed in working direction, end in front of the connection zone of the spring leaves with the cutting elements that are arranged in the upper region of the leaf spring assembly.

Due to the use of a leaf spring assembly designed in accordance with the invention, a spring behavior that is more precisely matched to the application purpose results. The spring leaves that are held multi-layered at their frame-side end at the frame support each other mutually in case of spring movements. Due to friction that occurs at the facing surfaces of the spring leaves during spring movements, the spring movements are additionally dampened, in particular such spring movements in which the spring leaves swing downwardly.

In that not all spring leaves that are held at the frame are connected to the cutting elements, a particularly soft and quickly reacting compression behavior—thus, a spring movement in upward direction—of those spring leaves that are connected to the cutting elements occurs. In particular at the beginning of the compression movement from a rest position that is provided primarily by the deformation of the spring leaves that are directly connected to the cutting elements, no high restoring forces are built up yet in these spring leaves. Minimal compression movements are therefore possible in a particularly sensitive manner. When the ground pressure that has triggered the already initiated evasive movement continues, for example, because the ground surface continues to rise under the cutting elements, the restoring forces which are built up in these spring leaves also increase continuously. Moreover, upon continued compression movement, the spring leaves which are connected to the cutting elements increasingly are supported on the additionally provided spring leaves that, in turn, then build up restoring forces by deformation. A compression movement is slowed in this manner by progressively increasing restoring forces. These restoring forces ensure for larger compression movements that the deflected spring leaf or spring leaves return the cutting elements very quickly into the initial position when the ground pressure acting on the cutting elements decreases again.

When the spring leaves, which are arranged in the upper region of the leaf spring assembly and to which the cutting elements are connected, are deflected in upward direction by a ground pressure acting on the cutting elements, the spring leaves arranged underneath have a less noticeable dampening action so that an evasive movement in upward direction is dampened only minimally. Also, the friction of the spring leaves on each other is less pronounced for an upwardly oriented spring movement. In that the spring leaves which are arranged in the lower region of the leaf spring assembly, viewed in working direction, end in front of the connection zone of the spring leaves with the cutting elements that are arranged in the upper region of the leaf spring assembly, increased ground pressure forces, which result from a rising ground level in the region of the rocker arm and act on the cutting elements, are not immediately transmitted to these spring leaves. The ground pressure forces act therefore in particular on the spring leaves arranged in the upper region of the leaf spring assembly and connected to the cutting elements and bend them in upward direction as long as they are acting on these spring leaves and are strong enough to bend these spring leaves an upward direction. In case of a downwardly oriented spring movement, the spring leaves which are located in the upper region of the leaf spring assembly contact again the spring leaves arranged underneath; they are thereby supported in their downward movement and braked. This holds true in particular if the spring leaves arranged in the upper region were to rebound past the zero position in downward direction were they not caught and braked in this movement by the spring leaves arranged in the lower region.

By the selection of the number, of the material, of the material thickness, of the length, and of the positioning of the spring leaves bundled to an assembly, a spring behavior results that, on the one hand, enables a quick and easy evasion of those spring leaves at which the cutting elements are held when they impact on ground elevations but, on the other hand, pushes the cutting elements downwardly again by the restoring forces built up during the compression movement as soon as the ground pressure acting on the cutting elements is reduced again, without undesirable continued swinging movements occurring in this context. Due to the dampening of a swinging movement in downward direction, a sine curve-type post-swinging movement is substantially prevented. The individual spring leaves comprise for this purpose a material elasticity that permits a plurality of compression and rebound movements in the context of the bending forces that occur in normal operation of the cutting mechanism without the spring leaves in this context becoming brittle and breaking due to material fatigue. The spring leaves return into their original shape and position due to their elasticity when the forces acting on them from the bottom pressure are canceled again.

In comparison to the known prior art, the response speed of the leaf spring assemblies combined of a plurality of spring leaves is improved also by a reduced mass inertia because rigidly embodied rocker arms can be entirely eliminated. The compression movements are more flexible because the individual or plurality of spring leaves to which the cutting elements are fastened are in particular upwardly moveable almost across their entire length while rigidly embodied rocker arms can evade only in a rotatory manner about their point of rotation in response to increased ground pressure and the springs engaging at a point of their partial length must be inevitably shorter, which results in a less flexible spring behavior and significantly worse spring response behavior.

By joining the spring assembly at the frame by means of clamping elements, the leaf spring assembly can be mounted easily. The clamping elements are resting on oppositely positioned surfaces at least on the top side and bottom side of the leaf spring assembly and in this context press the leaf spring assembly together from the exterior so that they are no longer movable in longitudinal direction. By means of the clamping elements connected to the frame, the carrying forces are transmitted well into the frame of the cutting mechanism. However, the clamping elements permit the leaf springs to perform an elastic spring movement across their entire length which, in case of a fixed connection of the leaf springs at the frame in the connection zone, would lead to brittle fracture after some time.

According to an embodiment of the invention, at least one or a plurality of the spring leaves held together at their frame-side end between clamping elements at the frame is/are connected to the cutting elements and comprise cutouts for passing through connection elements that connect the fastening plates to each other that are applied to the top side and bottom side of the spring leaf or of the spring leaves for connection of the cutting elements to the rocker arm. A few of the spring leaves are still sufficiently flexible in order to enable an easy ground adaptation of the cutting elements held at the rocker arms. Due to the use of at least two spring leaves that are held on each other, the friction forces during swinging movements of the spring leaves can be used in order to dampen the swinging movements. So that the second spring leaf upon spring movements can move relatively with respect to the first spring leaf in thrust direction, the cutout in the second spring leaf must be embodied as an elongated hole into which preferably a sleeve for passing through the connection element is inserted. This applies correspondingly for additional spring leaves if present. The fastening of the cutting elements at one or a plurality of spring leaves by fastening plates that are connected to each other enables flexible movements of the spring leaves without brittle fracture occurring, which could occur in case of a fixed connection in the connection zone between the cutting elements and the spring leaves.

According to an embodiment of the invention, at the bottom side of the leaf spring assembly a tension rod is attached which is connected with its leading end to the leading section of the leaf spring assembly to the latter and from there extends to the rear in the direction toward the frame, where it is movably held in an elongated hole and the leading and rearward ends of the elongated hole provide a stop for movements of the leaf spring assembly. By means of the tension rod, the swinging movements that can be performed by the spring leaves of the leaf spring assembly are limited by means of the stops. As long as the tension rod with its rearward end is movable within the length of the elongated hole, a compression or rebound of the leaf spring assembly and of the spring leaves is not limited by the stops and is free. When the tension rod however impacts at a stop, a further compression or rebound movement is immediately stopped. The spring movements of the rocker arms can therefore be held within a range in which a flexible adaptation of the cutting members to changes in the surface contour of the worked-on field is expedient, for example, a compression movement of the cutting elements from a neutral position up to 15 cm in height. Larger height changes in the position of the cutting elements must then be carried out by other adjustment members, for example, a corresponding height adjustment of the intake channel of the harvesting machine, support elements at the intake channel of the harvesting machine, bottom supports, for example, a height-adjustable wheel chassis or the like. The tension rod can comprise an overload protection, for example, a shear bolt or a targeted material weakening at the connection components, that separates the connection of the tension rod to the elongated hole when a load acts on the overload protection that exceeds the permissible limit value. Such an overload protection enables a compression movement of the leaf spring assembly that exceeds the range that is limited by the elongated hole and that helps to avoid greater damages at the cutting mechanism. The tension rod itself can be length-elastic in order to avoid hard impacts. Likewise, dampening means can be arranged in the region of the end stops in the elongated hole.

According to an embodiment of the invention, the cutting mechanism comprises sensors which detect the movements of the tension rods in the respective elongated holes, and the sensors transmit a position signal corresponding to the respective pivot position to an evaluation electronics connected to the sensors. By means of the sensor arrangement, the evaluation electronics receives information in regard to whether the leaf spring assemblies carry out evasive movements at all and how strongly the cutting elements are compressed at a point in time or across an observed time interval. The movement data transmitted by the sensors allow conclusions in regard to whether the cutting mechanism has been lowered far enough in order to be even able to utilize the flexibility of the leaf spring assembly and in order to cut the crop as close as possible to the ground, they indicate a cutting mechanism guidance that is too low, and they allow conclusions in respect to how uneven the surface to be worked is. Based on the speed of the movements, it is also possible to derive whether there are smooth changes in the ground surface such as knolls or depressions or whether there are rocks in the field that force a fast evasive movement. Observing the movements of the tension rods by sensors can be used by the evaluation electronics for displaying the movements and/or the remaining residual spring travel, it is possible to issue warning signals when the stops are reached, and/or adjustment recommendations to the driver of the harvesting machine and/or adjusting signals to cutting mechanism-associated and/or harvesting machine-associated control systems for height guidance of the cutting mechanism can be issued that lead to an automatic adjustment of the height position of the cutting mechanism and/or to a rotation of the cutting mechanism about the axis of rotation pointing in the travel direction.

According to an embodiment of the invention, on one or a plurality of leaf spring assemblies one or a plurality of support elements are positioned that support conveying surfaces located above the leaf spring assembly. The support elements comprise individual leaf springs or a leaf spring assembly in order to produce a connection of a conveying surface to the respective leaf spring assembly. The conveying surface can be actively driven, for example, as is the case in a circulating belt conveyor, or it is a passive conveying surface such as, for example, a sheet metal floor on whose top side the cut crop is moved in the direction toward the intake channel. Due to the movements of a leaf spring assembly, the conveying surfaces are also movable with the leaf spring assemblies and require a special support. A support element does not impair the spring movements of the respective leaf spring assembly. However, it enables supporting a conveying surface located above the leaf spring assembly in such a way on the leaf spring assembly that it follows the spring movements of the leaf spring assembly. Since the cutting elements that are fastened to the leaf spring assembly also follow the spring movements of the leaf spring assembly, hardly any changes in the relative spatial position of the cutting elements and of the conveying surfaces relative to each other occur even for compression or rebound movements of the leaf spring assemblies. Conveyance of the cut crop is therefore not impaired despite the continuously possible compression and rebound movements of the leaf spring assemblies. Complex supports of the conveying surface at the frame of the cutting mechanism and additional technical measures against worsening of the crop flow and crop losses can therefore be dispensed with. When on a spring leaf or on a leaf spring assembly a plurality of support elements are arranged, it is possible to support a conveying surface at a plurality of locations, for example, in the leading region close to the cutting elements and in the rearward region remote from the cutting elements. Since the spring movements of a spring leaf or of a spring assembly in the region that is remote from the cutting elements will be weaker than in the region that is neighboring immediately the cutting elements, a calming of the spring behavior of the conveying surface that is supported several times across its working width results from the combination of a support action neighboring the cutting elements and an additional one that is remote. For a spring movement of a spring leaf or of an leaf spring assembly, changes of the angle of attack of the conveying surface to the cutting elements will then result.

According to an embodiment of the invention, at least one of the support elements is connected in a longitudinally movable manner to the rocker arm. Due to compression and rebound movements of a rocker arm, not only changes in the spatial position of the conveying surfaces in vertical direction but also in horizontal direction result. This holds true in particular when the conveying surface adjoins the cutting elements so as to seal the transition from the cutting elements to the conveying surface, the conveying surface must then carry out in horizontal direction every movement that is performed by the cutting elements in order to avoid crop losses. When a fixed spatial relationship between the support element and the conveying surface is to be maintained, it is advantageous when at least one of the support elements is connected in a longitudinally movable manner to the rocker arm because the support element then can follow the movements of the conveying surface in horizontal direction due to its corresponding movability. The longitudinal movability is to be provided in particular in the working direction and opposite to the working direction. In case of pivot movements of the rocker arm, the support element moves along the longitudinal axis of the rocker arm. The support element can engage about the rocker arm in order to move, guided by form fit, along the rocker arm, and/or the support element is guided by grooves in the rocker arm that project into the tongues formed at the support element.

According to an embodiment of the invention, the longitudinally movable support element in its movement is moveably driven by one or a plurality of coupling rods that are supported in the leading section of the rocker arm or of the cutting element. The coupling rods are rigid in themselves and define a distance between two points predetermined by their length. In case of a plurality of sequentially arranged coupling rods that are connected by a movable axis, minimal length changes of the coupling rods by buckling movements result but these are however negligible. The coupling rods are connected rotatably to their connection points. When upon upward or downward movement of the rocker arm the distance is shortened between the leading section of the rocker arm or of the cutting element and the point at which actually the support element connected to the coupling rods is located, the coupling rods move the support element along the rocker arm to the rear so that the distance between the leading section of the rocker arm or of the cutting element and the support element at least approximately remains the same. When the rocker arm returns into its initial position and in doing so the distance is enlarged between the leading section of the rocker arm or of the cutting element and the point at which the support element connected to the coupling rods is actually located, the coupling rods then pull the support element along the rocker arm to the front again. For compression and rebound movements, the coupling rods transmit in this manner a movement of the cutting element in longitudinal direction to the support element. The support in the region of the leading section of the rocker arm means a region that is arranged in front of the support element moved by the coupling rod. The closer the leading support of the coupling rod is lying to the cutting element, the smaller are the length differences that result due to swinging movements of the cutting element in relation to the longitudinally movable support element. But even for a support of the leading end of the coupling rod in the central region of the rocker arm, usable displacement movements of the support element result. This applies in particular even when a portion of the distance between the longitudinally movable support element and the cutting element is bridged by another rigid component other than a coupling rod.

According to an embodiment of the invention, a holding element is connected to the longitudinally movable support element that delimits the movable conveying surface and guides it by followers. Due to its longitudinal movability, the support element is well suited to ensure, even for movements of the conveying surface in horizontal direction, that the conveying surface is guided in this context. This applies in particular when a movably driven conveying surface is concerned as is the case for circulating conveying belts of a draper cutting mechanism. In the holding element, for example, a guide groove can be formed through which a shaped body embodied at the circulating conveying belt and shaped complementary to the guide groove is passing. In conveying direction of the circulating conveying belt, a guiding action is provided in this way that holds the conveying belt in its nominal position. The holding element can also serve to secure the edge of the conveying surface against crop losses in that it closes gaps to adjoining components, for example, by corresponding strips, stays, and seal bodies that may also be produced of an elastic material.

According to an embodiment of the invention, a holding element is connected to the longitudinally movable support element that supports and guides a movable rear wall of a conveying path of the crop via the cutting mechanism. Upon movements of the conveying surface in horizontal direction, differently sized gaps between the edge of the conveying surface neighboring the rear wall and the rear wall would result through which crop can be lost and undesirable material accumulations could build up that could limit the movability of the components and lead to damages at the components. Due to the movably designed rear wall, the latter can follow the movements of the conveying surface in horizontal and/or vertical direction. In that the holding element is now designed such that it supports and guides the movably designed rear wall, the holding element transmits the movements of the rocker arm to the rear wall. The rear wall moves thus synchronously to the conveying surface. The generation of differently sized gaps between the rear wall and the conveying surface is thus avoided.

According to an embodiment of the invention, the holding element seals the transition between the conveying surface and the rear wall. Due to the additional sealing action, crop losses and the buildup of material accumulations are avoided.

According to an embodiment of the invention, support elements of neighboring leaf spring assemblies are connected by one or a plurality of stays pivotably connected to the support elements. Due to their pivotable connection, the pivotable stays still enable evasive movements of individual leaf springs or leaf spring assemblies but they can dampen deflection movements that are too strong of individual leaf spring assemblies in vertical direction. The stays are also suitable to support individual spring leaves or entire leaf spring assemblies against possible movements in a direction transverse to the forward travel direction. The stays are also suitable to transmit restoring forces from a spring leaf or a leaf spring assembly to a neighboring spring leaf or leaf spring assembly. Viewed across the working width of a cutting mechanism, the stays contribute to the spring movements of individual spring leaves and/or leaf spring assemblies being dampened and smoothed across the working width of the cutting mechanism.

According to an embodiment of the invention, the leading section of the rocker arm is supported by a torque support at the central section of the rocker arm. If the cutting element upon forward travel of the harvesting machine should impact on an obstacle shaped such that the rocker arm cannot evade it by an evasive movement, there is the risk that the cutting element could be pushed away downwardly and thereby buckled completely. The risk results in particular from the condition that the spring leaf or spring leaves at which the cutting element is attached comprise a certain flexibility. In order to reduce the risk of an unwanted buckling of the cutting element, the leading section of the rocker arm is supported by means of a torque support at the central section of the rocker arm. The torque support is preferably of a rigid configuration. It is connected at its leading end to the knife angle bracket at which the cutting element is fastened and at its rearward end is connected to a support element that is fastened to the rocker arm.

According to an embodiment of the invention, a gearbox with an output shaft connected thereto for driving the cutting elements and/or conveying members for conveying the crop is movably supported in an elongated hole in the frame in longitudinal direction. Due to the gearbox that is movable in longitudinal direction, spring movements of the spring leaves and/or of the leaf spring assembly are facilitated.

According to an embodiment of the invention, the spring characteristic line of the spring leaves of a leaf spring assembly of a rocker arm is designed such that upon deflection of a cutting element connected thereto by 10 cm a contact pressure that is in the range between 15 kg and 80 kg is generated from the built-up restoring forces. When the spring characteristic line is designed in this way, a good compromise is provided between a ground-near guiding action of the cutting element and a sufficiently flexible reaction to height changes in the contour of the surface of the field traveled across with the cutting mechanism.

According to an embodiment of the invention, leaf spring assemblies that have different spring characteristic lines are installed in the cutting mechanism. Due to the different spring characteristic lines, the contact pressure that is produced by the different rocker arms can be adapted to different weight loads of the individual rocker arms so that a contact pressure as uniform as possible results across the working width of the cutting mechanism.

It is expressly noted that the afore described embodiments of the invention, taken alone but also in any combinations with each other, can be combined with the subject matter of the independent claim, provided no technically forced obstacles are in conflict therewith.

Further modifications and embodiments of the invention can be taken from the following subject matter description and the drawings.

Figure 2:
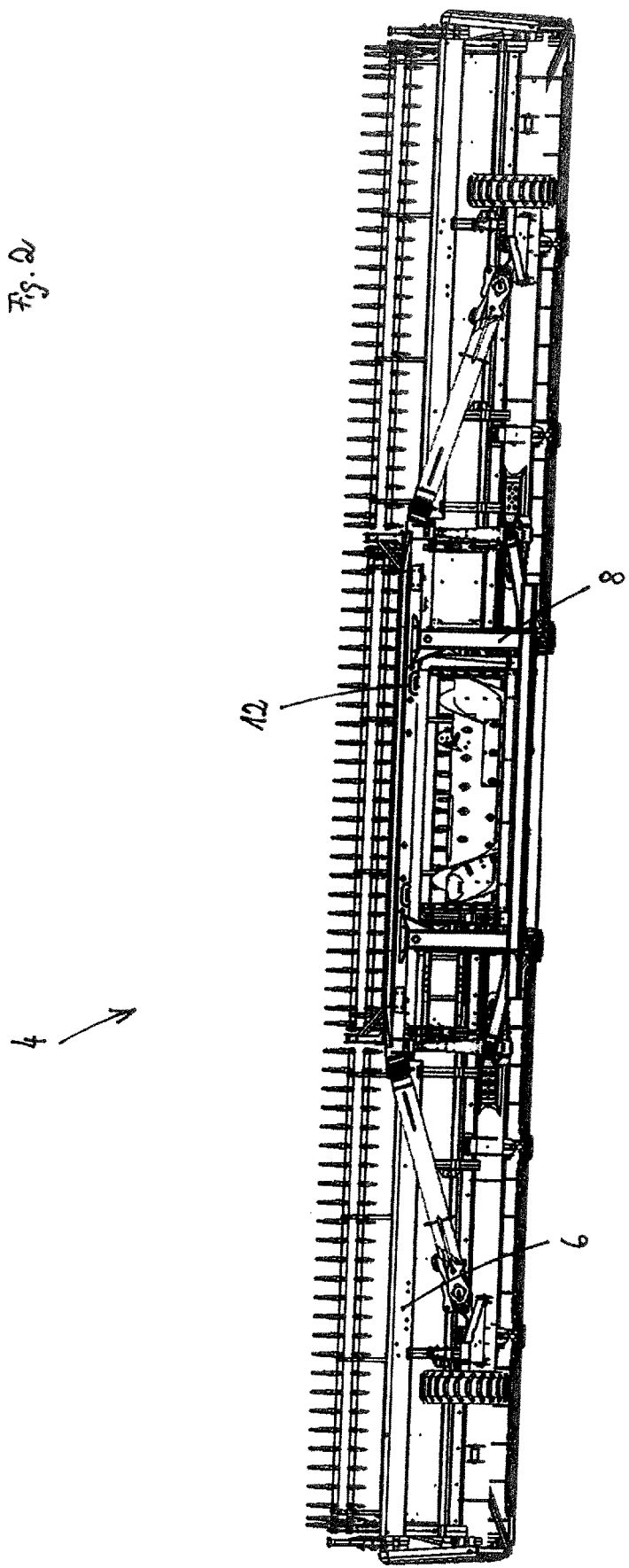
Figure 3:
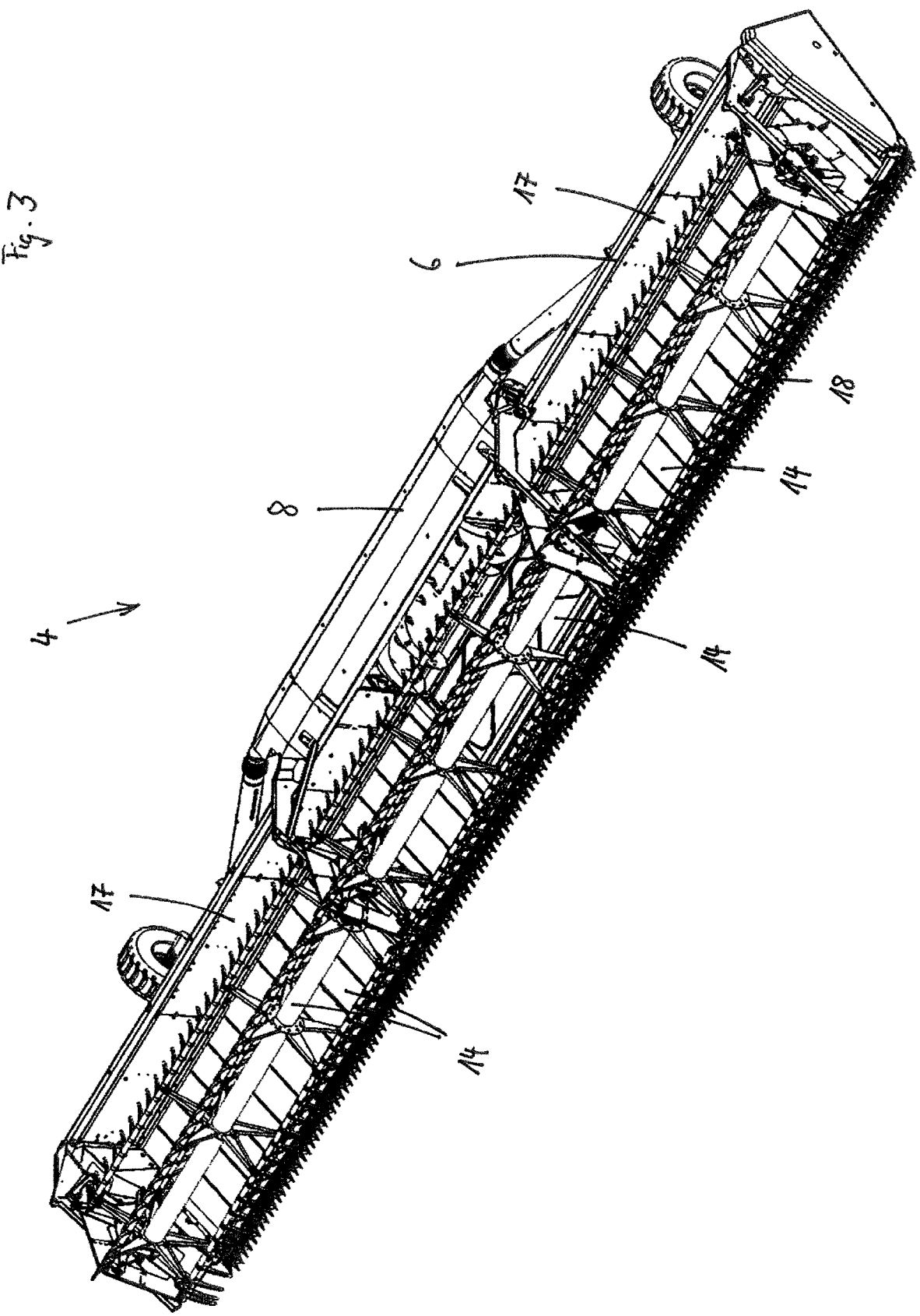
Figure 8:
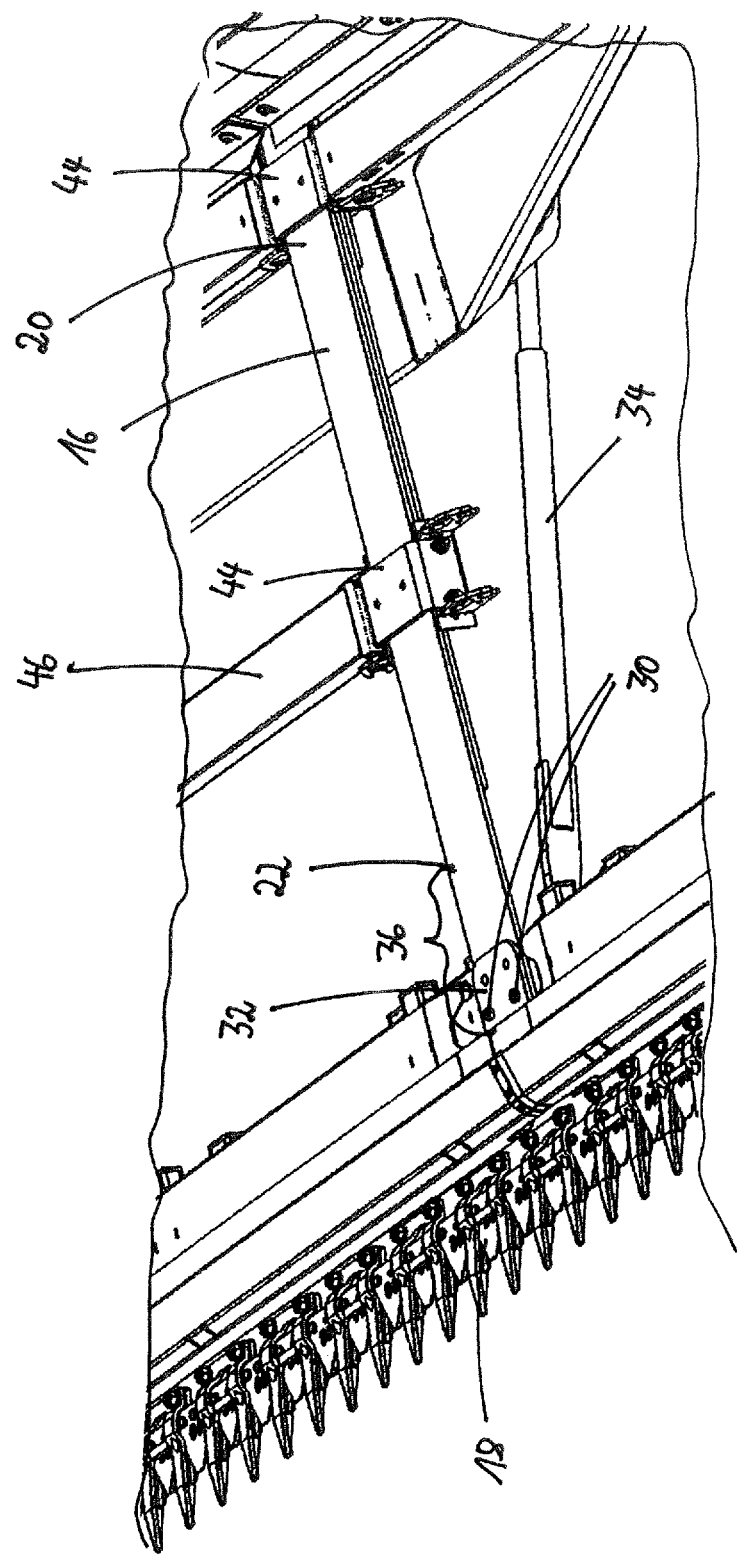
Figure 9:
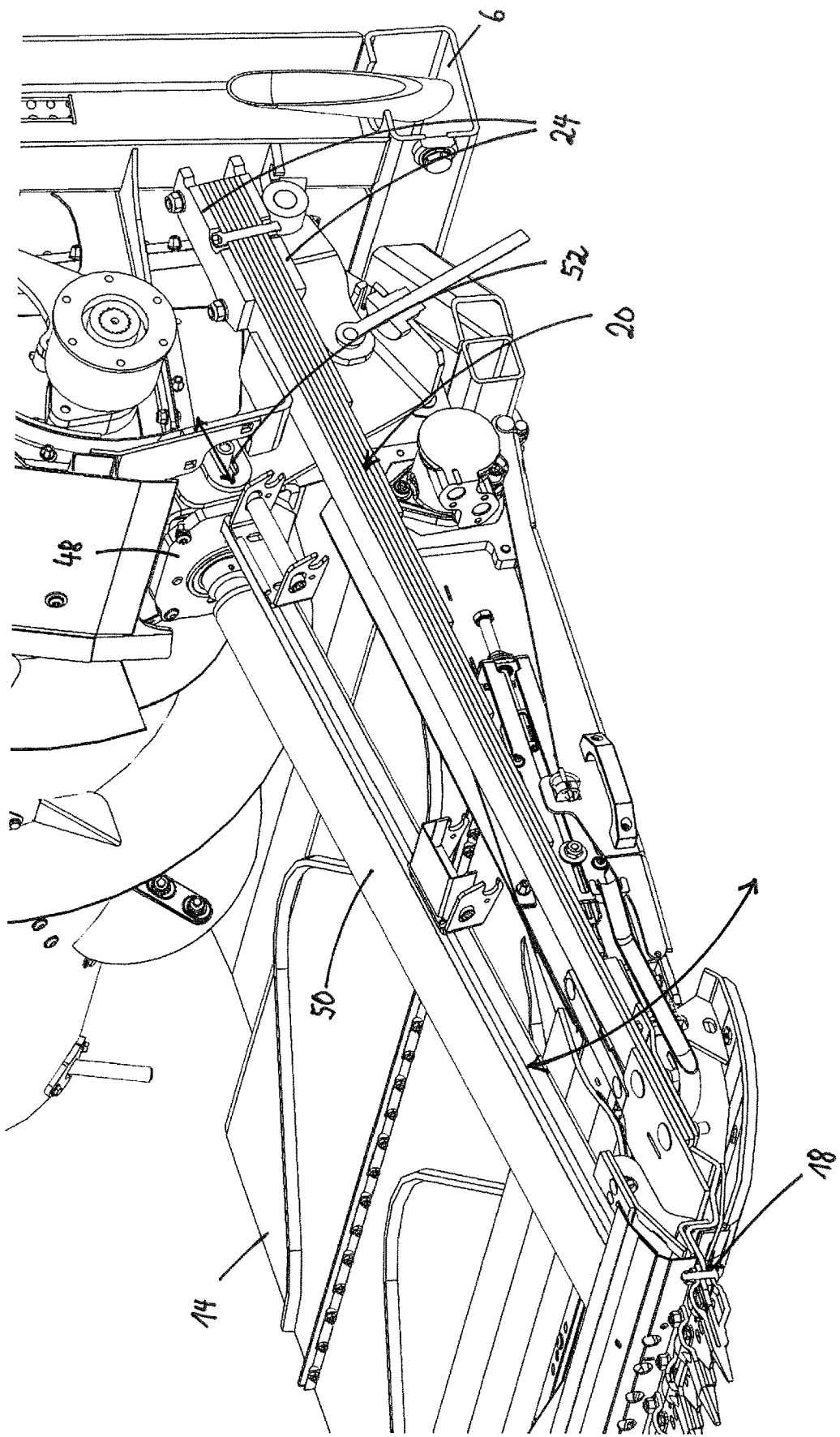
Figure 10:
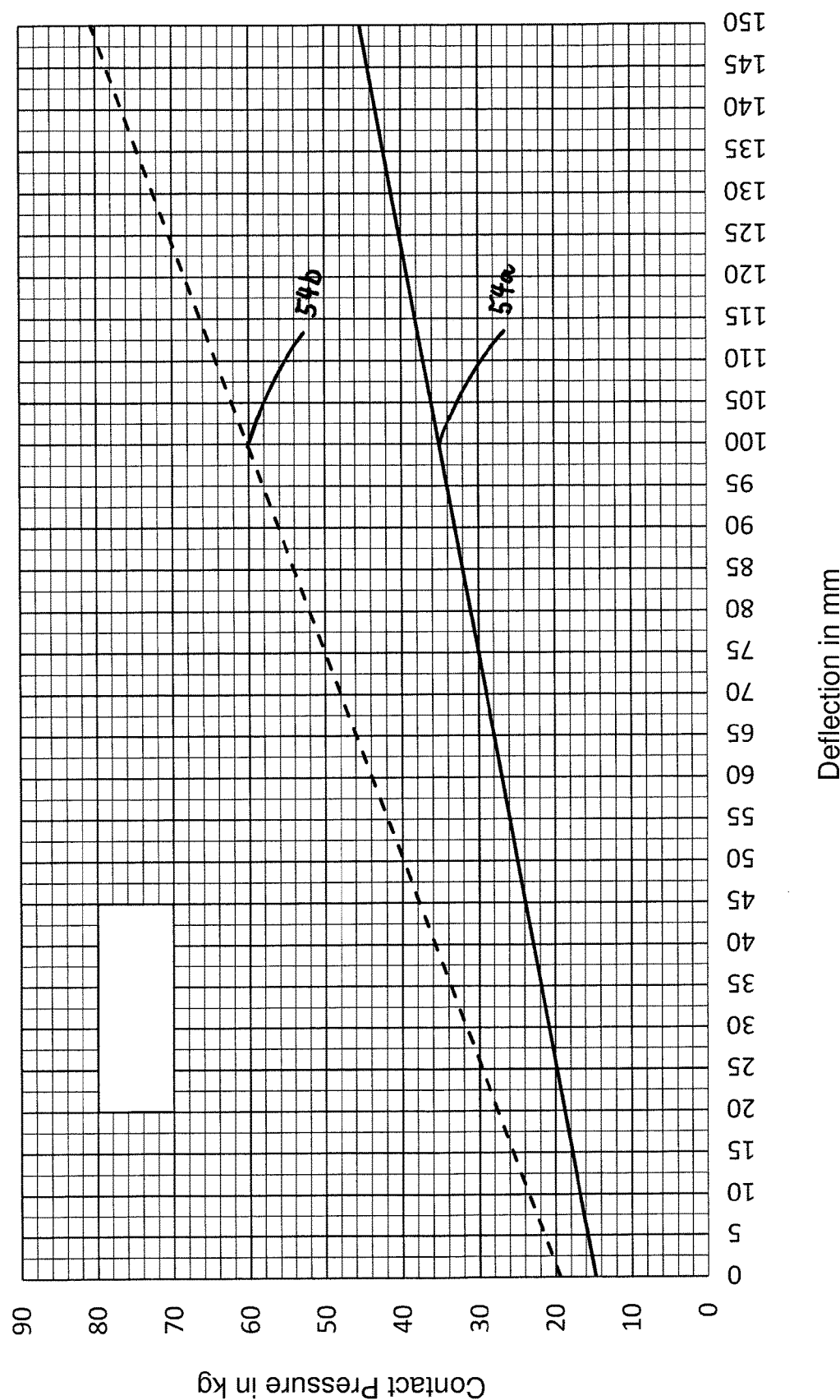
Figure 14:
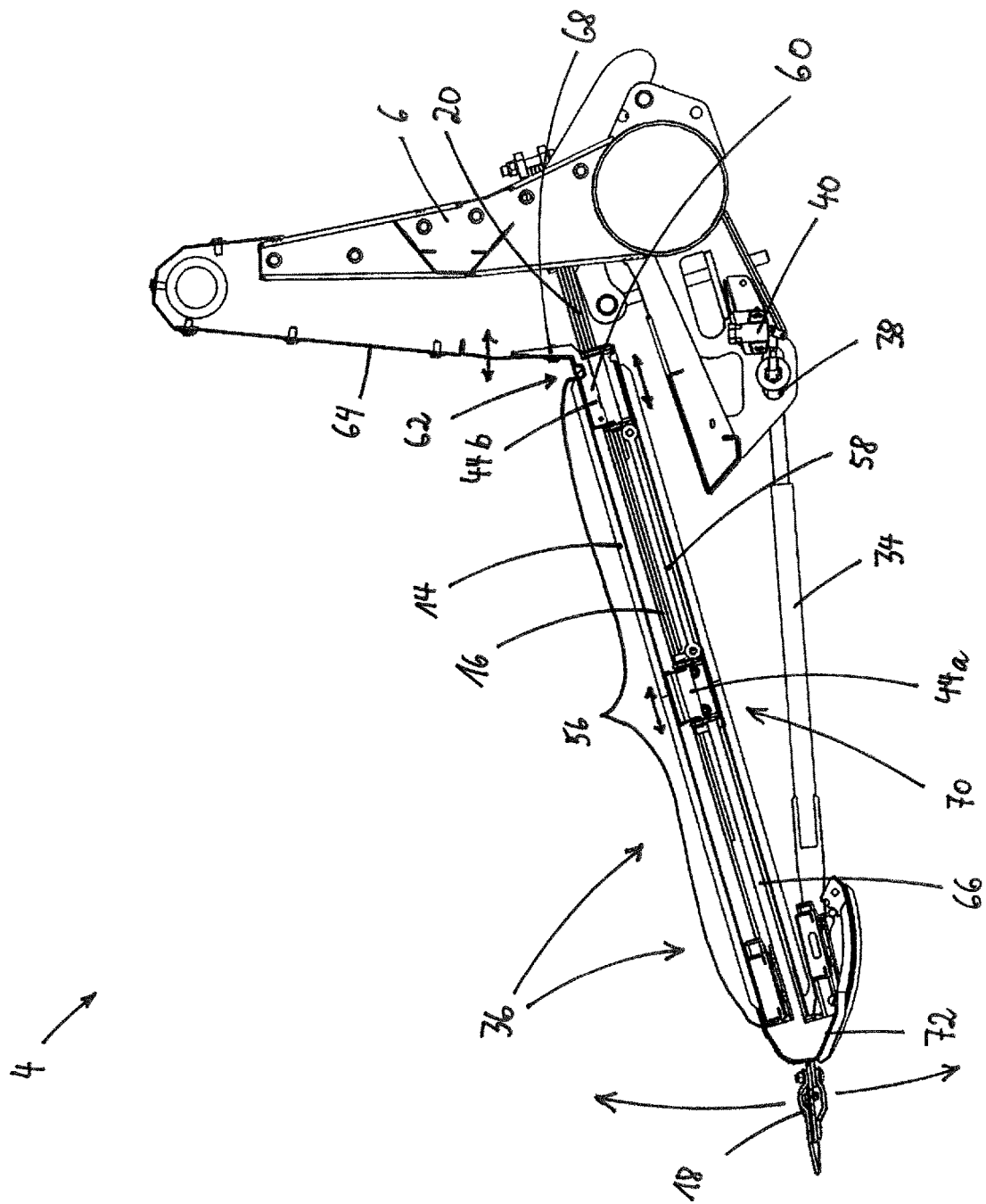

The invention will now be explained in more detail with the aid of embodiments. It is shown in:

FIG. 1: a view at a slant from the front of the harvesting machine with cutting mechanism;

FIG. 2: a view of a cutting mechanism from the rear;

FIG. 3: a view of a cutting mechanism in a view at a slant from the front and above;

FIG. 4: a view of the cutting mechanism illustrated in FIG. 3 but without the conveying members;

FIG. 5: a detail view of the fastening zone of a leaf spring assembly at the frame;

FIG. 6: a detail view at a slant from above of a rocker arm;

FIG. 7: a detail view at a slant from below of a rocker arm;

FIG. 8: a detail view of the region of a rocker arm;

FIG. 8*a*: an enlarged detail view of a connection zone between spring leaves and the cutting elements;

FIG. 9: a view of a leaf spring assembly with a gearbox arranged adjacent thereto;

FIG. 10: spring characteristic lines of rocker arms; and

FIG. 11: a section view of the cutting mechanism.

In FIG. 1, a view from the front at a slant of a harvesting machine 2 with a cutting mechanism 4 is illustrated. The cutting mechanism 4 comprises a frame 6 that is connected by an attachment frame 8 to the intake channel 10 of the harvesting machine 2.

In the view of the cutting mechanism 4 from the rear illustrated in FIG. 2, it can be seen that attachment means 12 such as, for example, arresting hooks are arranged at the attachment frame 8.

In FIG. 3, a view of a cutting mechanism 4 in a view at a slant from the front and above is illustrated. In this view, it can be seen that the cutting mechanism comprises a plurality of conveying members 14. In the illustrated embodiment, endless circulating belt conveyors are provided of which two outer belt conveyors convey the cut crop to the center and throw the crop onto a further belt conveyor that transports the crop to the rear in the direction toward the intake channel 10 of the harvesting machine 2. Instead of the belt conveyors, for example, screw conveyors can also be used in order to convey the crop in cutting mechanisms 4. Other conveying members are conceivable also. Above the bottom-side conveying members 14, there is also a reel as another conveying member 14 which, upon rotating movement, dips into the upright crop with the reel fingers and the rods at which the reel fingers are fastened, supports it while the stalks are cut close to the ground, and after the cut places the stalks onto the bottom-side conveying members.

At the front side of the cutting mechanism 4, a cutting element 18 in the form of a cutter bar is provided. The cutter bar is driven in oscillation in order to cut the crop at its stalks or stems. Depending on the crop and its condition, it is desirable to guide the cutting element 18 as close as possible to the ground in order to avoid crop losses. For example, in case of soybean it is necessary to cut the stems very close to the ground in order to avoid losses of soybeans. Likewise, it is advantageous in laid grain to cut as close to the ground as possible in order to also avoid crop losses there.

The cut crop is conveyed with the conveying members 14 along the rear wall 17 of the cutting mechanism 4. The rear wall 17 is closed in order to also avoid crop losses thereat.

In FIG. 4, a view of the cutting mechanism 4 illustrated in FIG. 3 is illustrated wherein however the conveying members in the region of the lateral frames are omitted. Thereby, in particular the rocker arms 16 can be seen at which the cutting element 18 is held. Shown is the central conveying belt as an example of a conveying member 14.

A plurality of or all rocker arms 16 are comprised of leaf spring assemblies 20 that are combined of several spring leaves 22. Several or all spring leaves 22 which are resting flat on each other are held together at their frame-side end between clamping elements 24 at the frame 6 as a leaf spring assembly 20. The clamping elements 24 are clamping plates that are connected by means of a screw connection to the frame 6. This can be seen well in the detail view of FIG. 5.

In FIG. 6, a detail view of a rocker arm 16 is illustrated. In the detail view in FIG. 6, it can be seen that only two spring leaves 22 extend to the leading region of the cutting mechanism 4 because a plurality of spring leaves 22 end in front thereof. The spring leaves 22 that end in front thereof are those spring leaves 22 that are arranged the lower region of the leaf spring assembly 20. Viewed in the working direction, they end in front of the connection zone 26 of the spring leaves 22 with the cutting elements 18 that are arranged in the upper region of the leaf spring assembly 20. This can be seen well in the view from below that is shown in FIG. 7.

In FIG. 8, a detail of a cutting mechanism 4 in the region of a rocker arm 16 is illustrated. In this view, a leaf spring assembly 20 is illustrated that is assembled of at least four spring leaves 22. In the illustrated embodiment, only the uppermost spring leaf 22 extends to the front into the region of the cutting elements 18 with which it is connected. For connection to the cutting element 18, a fastening plate 32 is placed onto the uppermost spring leaf 22. At the bottom side of the uppermost spring leaf 22, there is also a fastening plate 32 which is however not visible in the illustrated view. The upper and lower fastening plates 32 are connected to each other by connecting elements 30. The connecting elements 30 can be, for example, rivets or screws or other fastening means. So that the connecting elements 30 can connect the fastening plates 32 to each other, a corresponding cutout 28 is provided in the spring leaf 22 through which the connecting elements 30 can be passed.

FIG. 8 also shows that a tension rod 34 is attached to the bottom side of the leaf spring assembly 20. The tension rod 34 is connected with its leading end to the leading section 36 of the leaf spring assembly 20. The tension rod extends from there to the rear in the direction toward the frame 6 where it is movably held in an elongated hole 38 that is illustrated in FIG. 7. The leading and rearward ends of the elongated hole 38 form a stop for movements of the leaf spring assembly 20 when the tension rod impacts thereat upon spring movements of the leaf spring assembly 20.

Also shown in FIG. 7 is that the elongated hole 38 comprises a sensor 40 which detects by a lever linkage the movements of the tension rods 34 in the elongated hole 38. The sensors 40 transmit a position signal corresponding to the respective pivot position to an evaluation electronics 42 that is connected to the sensors 40.

FIG. 8 shows that two support elements 44 are placed onto the leaf spring assembly 20 in the embodiment and support conveying surfaces located above the leaf spring assembly. In FIG. 8, the conveying surfaces are not illustrated in order not to impair the view of the support elements 44. The conveying surfaces can be placed loosely onto the support elements 44 so that the conveying surfaces are supported by the support elements 44 only areally, the conveying surface can however also be fixedly connected to the support elements 44.

In FIG. 8, it is shown that the support elements 44 of neighboring leaf spring assemblies 20 can be connected by one or a plurality of stays 46 which are pivotably connected to the support elements 44. The stays 46 extend transversely to the working direction of the cutting mechanism 4. By means of the stays 46, it can be avoided, for example, that conveying belts sag between the leaf spring assemblies 20 and thereby convey the crop in a wave-shaped movement. By means of the support by means of the stays 46, a belt conveyor remains in a uniform horizontal plane. The stays 46 limit also the movability of the leaf spring assemblies 20 transverse to the travel direction.

In FIG. 8a, an enlarged detail view of a connection zone 26 between the spring leaves 22 and the cutting elements 18 is illustrated. In this embodiment, two spring leaves 22 extend into the connection zone 26. A fastening plate 32 is placed from above onto the upper spring leaf 22, a fastening plate 32 is placed from below onto the lower one of the two spring leaves 22. So that the lower spring leaf 22 in case of swinging movements of the leaf spring assembly 20 can compensate length differences between the upper and lower leaf spring assembly in one of the movement directions indicated by the double arrow, the cutouts 28b in the lower spring leaf 22, in contrast to the cutouts 28a in the upper spring leaf 22, are embodied as elongated holes that permit a relative movement of the lower spring leaf 22 in relation to the upper spring leaf 22 as length compensation.

In FIG. 9, it can be seen that, laterally displaced to the rearward end of the leaf spring assembly 20 in the cutting mechanism 4, a gearbox 48 is held in an elongated hole 52. Longitudinal movements of the output shaft 50 that might result from swinging movements of neighboring leaf spring assemblies 20, as they are indicated by the double arrow illustrated in FIG. 9, can be compensated now in the direction of the indicated double arrow due to the attachment in the elongated hole 52.

In FIG. 10, two possible spring characteristic lines 54a, 54b of rocker arms are illustrated. From the two illustrated spring characteristic lines 54a, 54b it can be seen that the leaf spring assembly 20 of a rocker arm 16 is designed such that it generates, for a deflection of the cutting element 18 connected thereto of, for example, 10 cm, a contact pressure from the built-up restoring forces that lies at approximately 35 kg—according to the spring characteristic line 54a—and 60 kg—according to the spring characteristic line 54b. According to an embodiment of the invention, the spring characteristic lines of the leaf spring assembly 20 of a rocker arm 16 lie in a range between 15 kg and 80 kg. In a cutting mechanism 4, leaf spring assemblies 20 with different spring characteristic lines 54 can be installed. For example, the leaf spring assemblies 20 which are close to the center belt of a draper cutting mechanism can generate a reduced contact pressure, for example, according to the spring characteristic line 54a because, due to the drive components and frame parts, they are already loaded more strongly with weight than other leaf spring assemblies 20 that comprise then a spring characteristic line 54b with higher contact pressures in order to compensate in this way the reduced weight load of these leaf spring assemblies 20. As a result, across the working width of the cutting mechanism 4 a contact pressure as uniform as possible is to be provided in this way with which the cutting mechanism 4 glides on the ground surface.

In FIG. 11, a section view of the cutting mechanism 4 is illustrated. In the illustrated embodiment in FIG. 11, a circulating belt conveyor as conveying member 14 is illustrated and forms on its top side the conveying surface 56. In case of upward and downward movements of the cutting element 18 and of the rocker arm 16 that are indicated by corresponding arrows, changes in the spatial position of the conveying surface 56 result. The conveying surface 56 must be supported even in a changed spatial position and guided in its conveying movement. For this purpose, the support elements 44a, 44b are fastened at the rocker arm 16 in a longitudinally movable manner which is indicated by the illustrated double arrows. The movements of the longitudinally movable support element 44b are transmitted by the coupling rod 58 which in the embodiment engages with its rearward end at the support element 44b and with its leading end at the support element 44a. The support element 44a is supported by a rigid torque support 66 at the leading end of the cutting mechanism 4. The torque support in this manner acts as a further coupling rod 58. The coupling rod 58 and the torque support 66 transmit movements of the cutting element 18 in the longitudinal direction to the support elements 44a, 44b.

Due to their longitudinal movability, the support elements 44a, 44b can follow the movements of the conveying surface 56 in a direction along the rocker arm 16. The support of the conveying surface 56 can be maintained in this manner also for upward and downward movements of the cutting element 18. In order to hold and guide the conveying surface 56 during upward and downward movements of the rocker arm 16 and of the cutting element 18, a holding element 60 is placed onto the rearward support element 44 that comprises a V-shaped groove as follower 62 in the embodiment. The belt conveyor is provided at the inner side of its conveying belt with an integrally vulcanized profile that is formed complementary to the shape of the follower and engages the cross section of the V-shaped groove as follower 62. When the support element 44b moves along the rocker arm 16, the follower 62 with its V-shaped groove entrains the belt conveyor and displaces it in accordance with the longitudinal movement of the support element 44b to the front or rear. In this way, the leading edge of the belt conveyor in longitudinal direction of the rocker arm 16 always remains in a sealing contact in relation to the cutting element 18 so that at the front edge of the belt conveyor upon movements of the rocker arm 16 and/or of the cutting element 18 no gaps are produced that could cause crop loss and a material accumulation. When the conveying surface 56 is not formed by a circulating belt conveyor but by a rigid sheet metal, the follower can also be embodied as a simple strap, hinge, or the like.

The holding element 60 is provided with a stay 68 by means of which crop losses across the rear edge of the belt conveyor are avoided. The stay 68 as a component of the holding element 60 is connected also to the movable rear wall 64 that supports the conveying path of the crop via the cutting mechanism 4 toward the rear and guides it. The movable rear wall is held via the stay 68 by the holding element 60. The movability of the movable rear wall 64 is also indicated by a double arrow. Upon movements of the longitudinally movable support element 44b, the holding element 60 entrains the movable rear wall 64 in the respective movement direction. Since the holding element 60, in the transition region between the conveying surface 56 and the rear wall 64, comprises a closed surface, it seals the transition between the conveying surface 56 and the rear wall 64.

In FIG. 11, it can be seen that the leading section 36 of the rocker arm 16 is supported at the central section 70 of the rocker arm 16 by a torque support 66. The leading end of the torque support 66 is connected to the knife angle bracket 72 at which the cutting element 18 is fastened. The rear end of the torque support 66 is connected to the support element 44a that, in turn, is fastened at the rocker arm 16.

The invention is not limited to the afore described embodiments. A person of skill in the art will have no difficulties to modify the embodiments in a way appearing suitable to him in order to adapt them to a concrete application situation.

LIST OF REFERENCE CHARACTERS 2 harvesting machine
4 cutting mechanism
6 frame (cutting mechanism)
8 attachment frame
10 intake channel
12 attachment means
14 conveying member
16 rocker arm
17 rear wall
18 cutting element (cutter bar)
20 leaf spring assembly
22 spring leaf
24 clamping element
26 connection zone
28 cutout
30 connection element
32 fastening plate
34 tension rod
36 leading section
38 elongated hole (tension rod)
40 sensor
42 evaluation electronics
44 support element
46 stay
48 gearbox
50 output shaft
52 elongated hole (gearbox)
54 spring characteristic line
56 conveying surface
58 coupling rod
60 holding element
62 follower
64 rear wall
66 torque support
68 stay
70 central section
72 knife angle bracket

What is claimed is:

1. A cutting mechanism for attachment to a harvesting machine, the cutting mechanism comprising:
a frame extending at least substantially across a working width of the cutting mechanism and comprising an attachment frame configured to connect the frame to an intake channel of the harvesting machine;
wherein the frame comprises rocker arms, wherein the rocker arms point in a working direction of the cutting mechanism and comprise leading ends in the working direction of the cutting mechanism;
cutting elements connected to the leading ends of the rocker arms and configured to cut a crop;
a plurality of or all of the rocker arms comprised of a leaf spring assembly, respectively, wherein each leaf spring assembly is assembled of spring leaves, wherein a plurality of or all of the spring leaves of the leaf spring assembly that are resting flat on each other are held together between clamping elements at an end of the spring leaves facing the frame and are connected to the frame;
one or a plurality of the spring leaves of each leaf spring assembly arranged in an upper region of each leaf spring assembly are connected to the cutting elements in a connection zone;
one or a plurality of the spring leaves of each leaf spring assembly held together between the clamping elements and arranged in a lower region of each leaf spring assembly, viewed in the working direction, end in front of the connection zone.

2. The cutting mechanism according to claim 1, wherein at least one of the spring leaves of each leaf spring assembly arranged in the upper region in the connection zone comprises cutouts configured to pass connection elements therethrough, wherein the connection elements connect fastening plates, placed onto a top side and a bottom side of the at least one of the spring leaves of each leaf spring assembly arranged in the upper region in the connection zone, to each other and connect the respective cutting element to the leaf spring assembly.

3. The cutting mechanism according to claim 1, wherein at a bottom side of each leaf spring assembly a tension rod is attached, respectively, wherein the tension rod comprises a leading end connected to a leading section of the respective leaf spring assembly, wherein the tension rod extends from the leading section in a direction toward the frame and comprises a rearward end held movably in an elongated hole of the frame, respectively, wherein the elongated hole comprises a leading end and a rearward end, wherein the leading end and the rearward end of the elongated hole form stops for movements of the respective leaf spring assembly.

4. The cutting mechanism according to claim 3, further comprising an evaluation electronics and sensors connected to the evaluation electronics, wherein the sensors are configured to detect movements of the tension rods in the elongated holes and transmit a position signal corresponding to a respective pivot position to the evaluation electronics.

5. The cutting mechanism according to claim 1, wherein one or a plurality of the leaf spring assemblies are provided with one or more support elements, respectively, wherein the one or more support elements support conveying surfaces located above the leaf spring assemblies.

6. The cutting mechanism according to claim 5, wherein the one or more support elements include a longitudinally movable support element arranged in a longitudinally movable manner on the leaf spring assembly, respectively.

7. The cutting mechanism according to claim 6, wherein the longitudinally movable support element is movably driven by one or more coupling rods that are supported at a leading section of the leaf spring assembly or the cutting element.

8. The cutting mechanism according to claim 6, further comprising a holding element connected to the longitudinally movable support element, wherein the holding element delimits a movable conveying surface and guides the movable conveying surface by followers.

9. The cutting mechanism according to claim 8, wherein the holding element seals a transition between the conveying surface and a rear wall of a conveying path of the crop.

10. The cutting mechanism according claim 6, further comprising a holding element connected to the longitudinally movable support element, wherein the holding element supports and guides a movable rear wall of a conveying path of the crop.

11. The cutting mechanism according to claim 10, wherein the holding element seals a transition between a conveying surface of the conveying path and the moveable rear wall.

12. The cutting mechanism according to claim 5, wherein the support elements of the leaf spring assemblies that are neighboring each other are connected to each other by one or a plurality of stays connected pivotably to the support elements.

13. The cutting mechanism according to claim 1, wherein the rocker arms each comprise a leading section and a central section, wherein the leading section is supported at the central section by a torque support, respectively.

14. The cutting mechanism according to claim 1, further comprising a gearbox comprising an output shaft configured to drive the cutting elements and/or conveying members for conveying the crop, wherein the gearbox is held movably in a longitudinal direction in an elongated hole in the frame.

15. The cutting mechanism according to claim 1, wherein a spring characteristic line of the spring leaves of a leaf spring assembly is configured such that upon a deflection of the respective cutting element connected to the leaf spring assembly by 10 cm a contact pressure of the cutting mechanism on the ground is generated from built-up restoring forces, wherein the contact pressure is in a range between 15 kg and 80 kg.

16. The cutting mechanism according to claim 15, wherein the leaf spring assemblies comprise different spring characteristic lines.

\* \* \* \* \*